United States Patent

[11] 3,566,903

| [72] | Inventor | Don R. Honeycutt<br>Bryan, Tex. |
|---|---|---|
| [21] | Appl. No. | 840,882 |
| [22] | Filed | Apr. 24, 1969<br>Division of Ser. No. 639,360, May 18, 1967, abandoned. |
| [45] | Patented | Mar. 2, 1971 |
| [73] | Assignee | Omark-Prentice Hydraulics, Inc.<br>Portland, Oreg. |

[54] DUMP VALVE
4 Claims, 6 Drawing Figs.

[52] U.S. Cl. ................................................ 137/106,
91/442, 91/464, 137/107
[51] Int. Cl. .................................................... F15b 13/04
[50] Field of Search ........................................... 91/268, 420
(pt.), 442, 455, 464; 137/102, 106, 107, 596.1,
596.18, 625.63, 625.69

[56] References Cited
UNITED STATES PATENTS
228,532  6/1880  Hoyt .............................. 137/107

546,907  9/1895  Smith .......................... 91/268X
3,216,454  11/1965  Richter et al. ................. 137/625.69
3,398,644  8/1968  Wetzel et al. ................. 91/420X Primary Examiner—Robert G. Nilson
Attorneys—James F. Weiler, Jefferson D. Giller, William A. Stout, Paul L. DeVerter, II, Dudley R. Dobie, Jr. and Henry W. Hope ABSTRACT: The present invention relates to hydraulic control systems, and in particular, to an improved dump valve to be used in such systems utilizing dump valves. The present invention discloses improved dump valves having a single spool and spool chamber with inlet and outlet openings at either end thereof and having a drain outlet intermediate the ends of the spool chamber. This single valve structure can be used for both hydraulic lines supplying actuating fluid to, and removing actuating fluid from, both sides of the piston in a cylinder operated by the remote control system.

PATENTED MAR 2 1971

Don R. Honeycutt
INVENTOR

BY James F. Weiler
William A. Stout
Dudley R. Dobie, Jr.
Henry W. Hyde
ATTORNEYS Don R. Honeycutt
INVENTOR

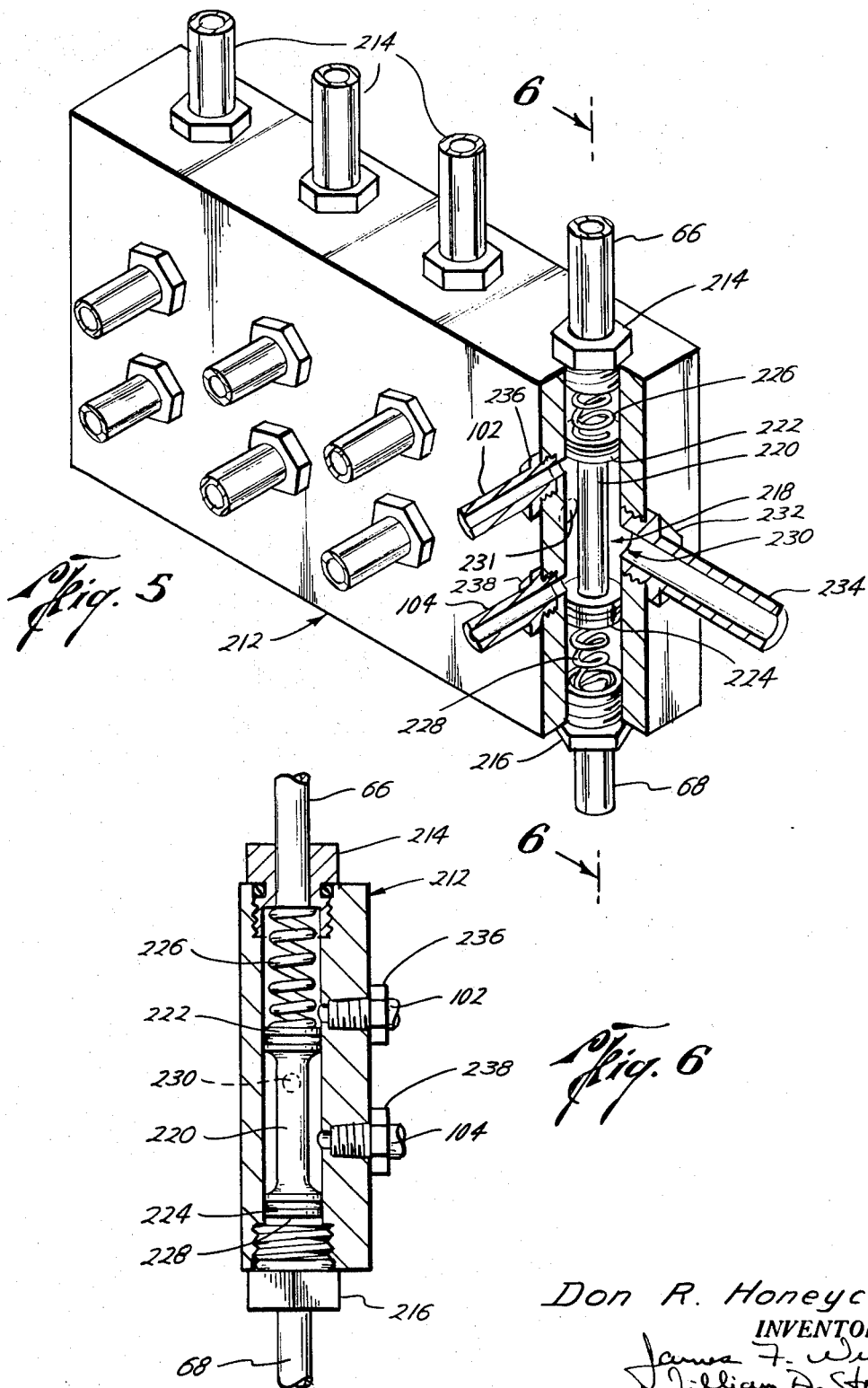

DUMP VALVE

CROSS REFERENCE TO RELATED APPLICATION

The present invention is a divisional application of my copending application Ser. No. 639,360, filed May 18, 1967, and entitled IMPROVED HYDRAULIC CONTROL SYSTEM.

BACKGROUND OF THE INVENTION

The present invention relates to an improvement in hydraulic control systems and more particularly in hydraulic remote control systems. A problem common to such systems is that of pressure buildup in the hydraulic lines. One solution to this problem is the use of lines of sufficient diameter to prevent such buildup. This, however, would require in some installations the use of lines of such size that the unit would no longer be small or portable enough for a man to handle. Furthermore, even with the use of these large lines, response time is not as fast as is desired due to the fluid resistance in the lines.

The use of lines of acceptable size develops a substantial pressure buildup as fluid moves through the system. As the lines increase in length, so does the pressure developed by the fluid flow. This is, of course, unsatisfactory and could be dangerous in some applications due to the fact that this back pressure prevents proper fluid movement and produces a slow response time.

The problem develops due to the fact that these systems are closed systems and the hydraulic fluid must travel from the remote control means to the controlled or activated apparatus and then back as the system returns to neutral or operates in a reverse manner. Where the system utilizes two lines, as in the application of the invention given herein, fluid moving toward the apparatus to be activated must push fluid in the other line back. As one skilled in this art would realize, when the lines are of substantial length, the back pressure built up in the system could become quite large and severely hamper the proper operation of the device.

SUMMARY OF THE INVENTION

The present invention circumvents the above problem by utilizing dump valves to take fluid out of the system, thus preventing the buildup of back pressure and the need for overcoming it due to the fact that the present invention eliminates the necessity of returning the fluid through the lines to the remote control apparatus. The dump valves connect to lines leading to the tank used for the storage of the hydraulic fluid. By locating the dump valves close to the apparatus activated by the hydraulic fluid and to the storage tanks, the fluid returning or being forced from this apparatus is quickly removed.

Since the removal of fluid occurs closely adjacent the activated apparatus, the remainder or substantially all of the hydraulic line remains full of fluid. The result is a quicker response time when fluid is directed to the apparatus to be activated through the line from which returning fluid has been previously dumped.

It is, therefore, an object of the present invention to provide an improvement in hydraulic control systems which will improve their reliability and speed of operation.

It is still a further object of the present invention to provide an economical and dependable hydraulic remote control apparatus which is simple in both operation and manufacture, and which includes means to eliminate the necessity of overcoming the return back pressure developed within the hydraulic lines.

Another object of the present invention is to provide a hydraulic remote control system which circumvents the problem of back pressure by eliminating the necessity of returning the hydraulic fluid to the remote control apparatus.

An additional object of the present invention is to utilize in such a control system quick dump valves positioned in the hydraulic lines relatively close to the apparatus, which is actuated or controlled by the hydraulic fluid, whereby fluid flowing from this apparatus is removed from the control system by these valves, thus preventing this fluid from traveling through the lines wherein the back pressure has built up.

A still further object of the invention is to provide such an improved valve which will permit only fluid returning from the activated apparatus to exit from the system, whereby the remainder of the hydraulic lines will remain filled with fluid for a quicker response time and to provide for ease of manual operation when necessary.

Further objects, features and advantages will be apparent from the following description of a presently preferred embodiment of the invention, given for the purpose of disclosure, when taken in conjunction with the accompanying drawings.

BRIEF DESCRIPTION OF THE DRAWINGS

In the following drawings, like character references designate like parts throughout the several views which are as follows:

FIG. 5 is a perspective view, partially in section, of a modified embodiment of the dump valve, showing the spool in its normal or spring-biased position; and FIG. 6 is a side view taken along section line 6–6 of FIG. 5, showing the spool in one of its open positions.

DESCRIPTION OF THE PREFERRED EMBODIMENT

Figure 1:
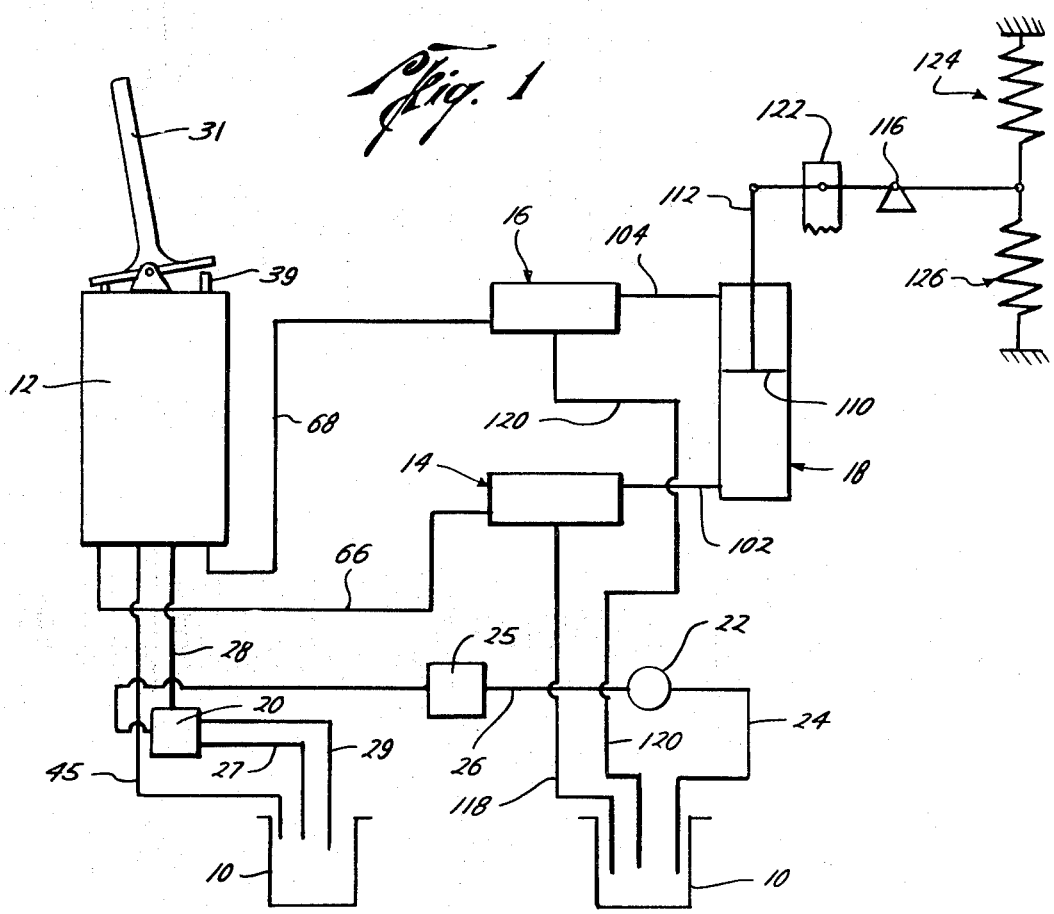
FIG. 1 is a schematic view of the present invention as utilized in a hydraulic remote control system.

Referring now to the drawings, the present invention will be described as utilized in a hydraulic remote control system for the actuation and control of a slave cylinder, the piston of the cylinder being operatively connected to an operating element of a main valve bank. The hydraulic fluid utilized in this system will be hereinafter referred to as oil for purposes of simplicity. It is, of course, understood that any suitable substance may be utilized for the hydraulic fluid.

A remote control system in which the present invention may be utilized is shown in FIG. 1 and is comprised generally of a plurality of common tanks 10 for the storage of oil, a remote control valve 12, dump valves 14 and 16, and a slave cylinder 18. In addition to these main components, there is also included a priority flow valve 20 and a pump 22, as well as tubing or hydraulic fluid lines to connect the various components.

In particular, the tanks 10 are used to store and as a source of supply of the hydraulic fluid or oil which is used in the system. They are connected by suitable conduit means, which are not shown, to comprise, in effect, a common tank. Accordingly, the system of tanks 10 will hereinafter be referred to in the singular.

Tank 10 is connected by a line 24 to the pump 22, which pulls the fluid from the tank 10 and conveys it by means of a line 26 through a directional control valve 25 and to the priority flow valve 20. This priority flow valve diverts a portion of the fluid through a line 28 which connects the priority flow valve 20 to the remote control valve bank 12. A pressure relief line 27 and return line 29 connect the priority valve 20 to the tank 10.

Figure 4:
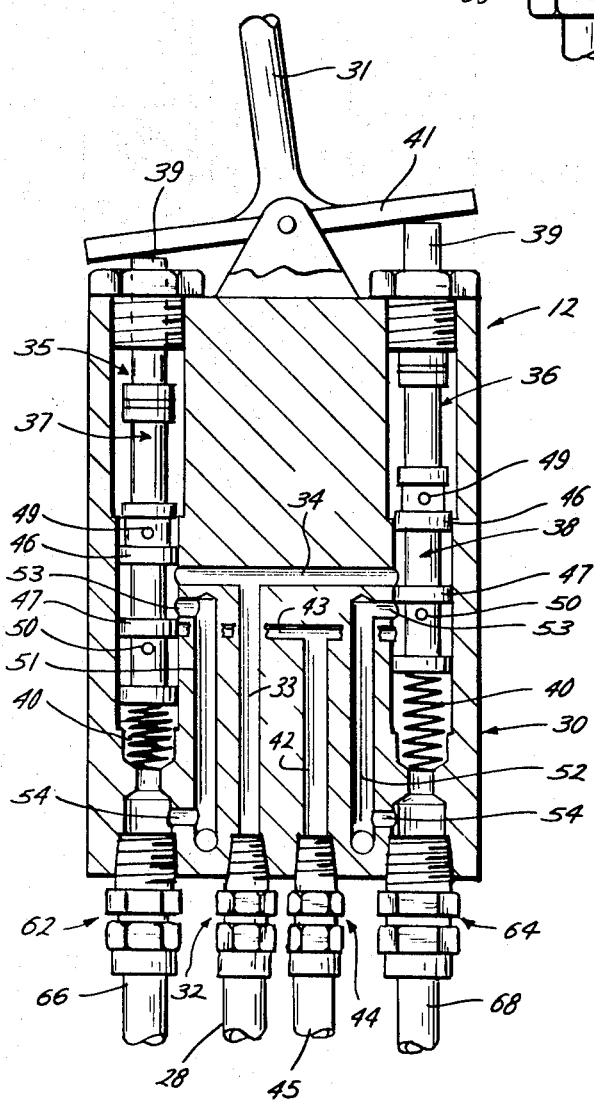
FIG. 4 is a side view, in section, of the remote control valve bank of FIG. 1.

Referring now to FIG. 4, the remote control valve bank 12 is comprised generally of a casing 30 and a manually operated handle 31. The line 28 is connected to the casing by means of a coupling member 32. Extending upwardly from the coupling member 32 and in fluid communication therewith is an interior passageway 33. The passageway 33 connects with a horizontally extending passageway 34 which in turn communicates with vertically extending piston valve chambers 35 and 36.

Mounted for sliding motion within the chambers 35 and 36 are the spools 37 and 38, respectively. These spools have lug members 39 at their upper ends. Springs 40 urge the spools upwardly, whereby they assume the position of spool 38 in FIG. 4, in which position the lug member 39 extends out of the top of the valve bank casing 30. An outwardly extending peripheral flange 41 on the handle 31 acts against these lug members 39 to raise and lower the spools 37 and 38 to operate the valve bank, as will be explained.

A drain passageway 42 communicates with the spool chambers 35 and 36 by means of the horizontally extending passageway 43. Coupling member 44 extends out of the bottom of the remote valve bank 12 and connects the drain passageway 42 with the hose member 45 which terminates at the tank 10.

Turning now to the spool members 37 and 38, two sealing flanges 46 and 47 are carried on each of the spools. These flanges 46 and 47 are form a sliding peripheral seal with the interior sidewalls of the chambers 35 and 36. Openings 49 and 50 on the spools 37 and 38 are connected by means of a passageway (not shown) extending through the interior of the spools.

The interior passageways 51 and 52 extend substantially parallel to the valve chambers 35 and 36. The passageways 51 and 52 are connected by means of passageways 53 and 54 to the valve chambers 35 and 36, as shown.

Coupling members 62 and 64 extend from the bottom of the valve bank 12 and are in fluid communication with the lowermost portions of the valve cylinders 35 and 36, respectively. Connected to these coupling members are the lines 66 and 68 which are also connected to the dump valves 14 and 16. In this manner, the dump valves 14 and 16 are placed in fluid communication with the valve chambers 35 and 36, respectively.

Figure 2:
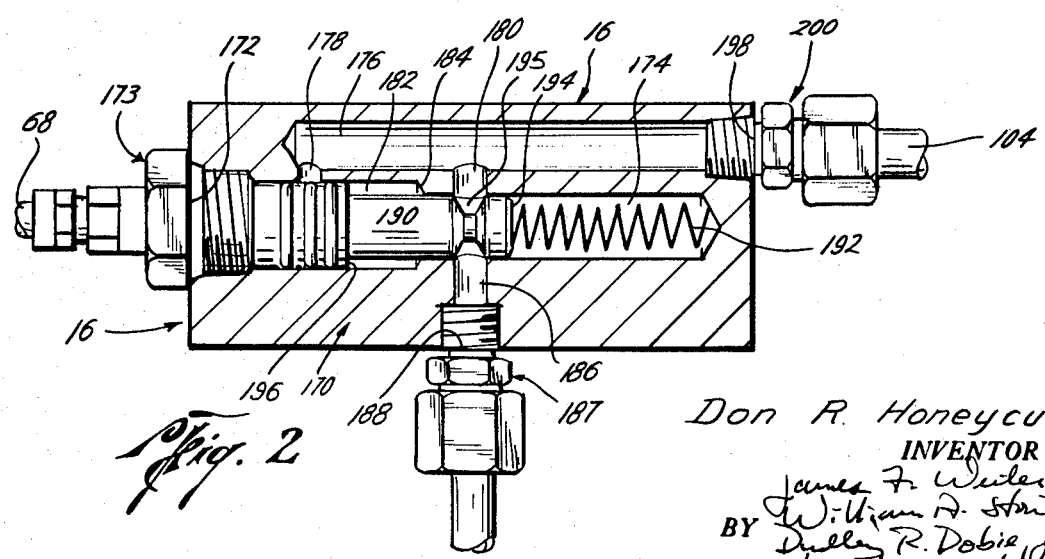
FIG. 2 is a side section view of one of the dump valves utilized in FIG. 1, showing the spool in its normal or spring-biased position.
Figure 3:
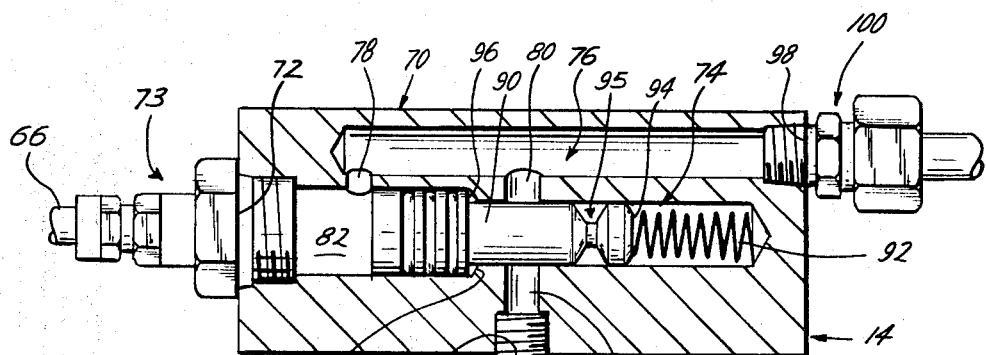
FIG. 3 is a side section view of the other dump valve of FIG. 1, the spool being in its open position.

Turning now to FIGS. 2 and 3 and to the construction of valves 14 and 16, the structure of valve 14 only will be described. The two valves are identical in their construction, and the numerals used to designate corresponding elements in the valves are the same, except that the numerals used with the valve 16 are in the 100 series. For example, the element designated by numeral 70 in the valve 14 would correspond to the element designated by the numeral 170 in valve 16.

Turning now to valve 14 shown in FIG. 3, the line 66 is connected to the valve body 70 at a port 72 by the coupling members 73. Contained in the valve body 70 are two essentially parallel passageways 74 and 76. These passageways are connected by the openings 78 and 80.

Passageway 74 has an enlarged portion 82 adjacent the port 72. As the enlarged portion 82 tapers to form a passageway of a smaller diameter, an annular shoulder 84 is formed. In the narrow portion of the passageway 74, a passageway 86 extends perpendicular to the passageway 74 opposite passageway 80 and terminates at a port 88. Extending outwardly from and communicating with the port 88 is a coupling member 89. The port 88 is connected to the storage tank 10 by a line 118, which is connected to the coupling 89. In like manner, the tubing 120 connects the port 188 of dump valve 16 to the tank 10.

A spool 90 is mounted within the passageway 74 for sliding motion therein. A spring 92 is also contained in passageway 74 and acts against an end 94 of the spool to urge the spool toward the port 72. Closely adjacent the end 94 of the spool is a recessed portion 95.

The passageway 76 terminates in a port 98 which is located in the opposite end of the valve body 70 from the port 72. Extending outwardly from the port 98 is the coupling element 100.

Discussing now both of the dump valves 14 and 16, tubing 102 and 104, respectively, are connected thereto by couplings 100 and 200. The opposite ends of the lines 102 and 104 are connected to the slave cylinder 18 by the couplings 106 and 108. The cylinder 18 is partially broken away to show the piston 110 mounted in the cylinder 18. Connected to the piston 110 is a rod or shaft 112 for movement with the piston. Rod 112 is connected to an appropriate linkage 114 which pivots about point 116. Linkage 114 is connected to a member 122 of the main valve bank (not shown) for the actuation of the member 122 along a reciprocating path as shown by the arrow. Springs 124 and 126 are connected to linkage 114 to keep it centered when it is not being actuated by the slave cylinder 18.

Turning now to the operation of the disclosed system, the priority flow valve 20 diverts a portion of the oil supplied under pressure from the tank 10 by the pump 22 to the remote control valve 12. The pressure of the oil is controlled by the pump 22 and the relief and return lines 27 and 29. The maximum pressure at which the oil is supplied to the remote valve banks 12 is 400 p.s.i.

To control the member 122 on the main valve bank, the operator manipulates the handle 31. In FIGS. 1 and 4 of the drawing, the handle 31 has been pushed to the left, whereby the flange 41 contacts the left-hand lug 39, forcing it into the housing 30. This pushes the spool 37 down, overcoming the force presented by the spring 40. The lowering of the spool 37 places the passageway 51 into fluid communication with passageway 34. The oil that is fed into passageway 33 from the priority flow valve 20 is now able to flow through passageway 51 to the lowermost portion of chamber 35, and to line 66. This oil flows through the line 66 in the direction of the arrows shown. The line 66 is generally from 30 to 60 feet in length, whereby adequate freedom is provided for the remote control valve bank with respect to movement away from the slave cylinder 18.

The springs 40 normally bias the spools 37 and 38 upwardly into the position in which spool 38 is shown in FIG. 4. In this position, the peripheral sealing surfaces 47 separate the passageway 34 from the passageways 53. As can be seen, therefore, when the spools are in the position of spool 38 in FIG. 4, the oil flowing into the valve chambers would become trapped in the portion of the chamber lying between the sealing surfaces 46 and 47.

A slight amount of leakage will likely occur around the surfaces 46 and 47. Oil passing by the surfaces 46 will flow into the openings 49 and out of the openings 50. Eventually, therefore, any leakage will find its way to the portion of the chamber lying below the sealing surface 47. From there, the leakage may flow through the passageway 42, coupling means 44, line 45 and to tank 10. Since any oil leaking beyond these sealing surfaces would be under no appreciable amount of pressure, there will be no effect on the dump valves 14 and 16 should the leakage flow into the passageways 51 and 52.

When the spools 37 and 38 are pressed down by operation of the lever 31, the sealing surfaces 47 pass by passageways 53, whereby the passageways 53 are placed into fluid communication with their respective passageway 34. When a spool is in its fully open or down position, its sealing surface 47 closes passageway 43 to prevent the escape of oil to tank 10. The volume of oil flowing through the passageways 53 is controlled by movement of lever 31 against lug 39, whereby the position of the surfaces 47 over the passageways 53 can be regulated. In this manner, the operator can control the size of the openings connecting the chambers to the passageways 53, the larger this opening, the greater the amount of oil flowing to the dump valves. This develops a certain "feel" in the lever 31 to enable the operator to have better control. Such would not be the case, for example, in an electrical control system. Another advantage of the hydraulic control system is that the operator is insulated from an electric charge should the mechanism being controlled, for example, a crane, contact a high-voltage wire or the like.

Turning now to the operation of the dump valves, and particularly to FIGS. 2 and 3, the spring member 92 normally forces the spool 90 in dump valve 14 against the port 72, thereby closing this entrance into the inner chamber 74. The oil flowing through the line 66 is, however, under pressure and supplies enough force to overcome the resistance of spring 92, thus forcing the spool into the position shown in the drawing. In this position, the opening 78 connecting the passageways 74 and 76 is cleared to allow the flow of oil through the dump valve as shown by the arrows. This oil exits through the port 98 and continues to the slave cylinder 18 by means of the tubing member 102.

Upon entering the slave cylinder 18, the piston 110 will be forced away from the port through which the oil is entering. In the situation shown in the drawing, the piston 110 will be forced to the right. In like manner, the rod 112 will also move to the right, which motion will be transmitted by means of the linkage 114 to the main valve bank element 122 for operation and control of the main bank.

As the piston 110 moves to the right, oil present in the system will be forced out of the cylinder 18, through line 104 to the dump valve 16. Normally, this fluid exiting the cylinder would have to travel the entire length of the lines 104 and 68 to the remote valve 12. This problem is overcome in the present invention by the utilization of a dump valve relatively close to the slave cylinder, for example, 20 to 30 inches.

Since no fluid is being directed through line 68 by the remote control valve bank 12, which would exert a force against the spool 190, the spool is in its normally spring-biased position shown in the drawing. In this position, the port 172 is no longer in communication with either of the openings 178 or 180. Because of the recessed portion 195, however, the opening 180 is placed in fluid communication with the passageway 186. As can be readily seen, fluid that is forced to exit from the cylinder 18 by the action of the piston 110 flows through the dump valve 16, line 120 and to the tank 10. This line 120 is, once again, generally no longer than 24 inches. Thus, the oil which is forced from the cylinder 18 is quickly removed from the control system and returned to the supply tank 10.

Movement of the control handle 31 to the right would reverse the previously described operation. The oil or hydraulic fluid would then be directed through the dump valve 16. The oil would overcome the resistance of the spring 192 and force back the spool 190, thereby allowing the fluid to flow to the cylinder 18.

As is readily understood, line 68 remained full of fluid during the time that fluid was being directed through line 66, only the fluid in line 104 being dumped from the system. As seen, therefore, only line 104 must be filled with fluid during this reverse operation to start the piston 110 moving in the opposite direction. Accordingly, a quicker response time in reversing the control functions is achieved.

Since no fluid would be flowing through the dump valve 14, the spool 190 would return to its normal position due to the action of the spring 92. Fluid that is forced from the cylinder by the action of the piston would then be dumped through valve 14 to the storage tank 10.

A further advantage is found in the fact that it is sometimes desirable to operate the main valve bank by manual movement of the linkage 114. Since any movement of linkage 114 also moves the piston 110, such manual operation of prior art mechanisms would necessitate the forcing of hydraulic fluid all of the way back to the remote control valve bank 12. This would render manual operation extremely difficult, if not impossible, due to the back pressure buildup.

In the present invention, however, when no fluid is being directed from the remote valve bank, the spools of dump valves 14 and 16 assume the position of spool 190 in FIG. 2. In this position, both of the dump valves are open to the tank 10. It is only necessary, therefore, to force the fluid back through the respective dump valve to tank 10. Manual operation in either direction is, therefore, quite easy.

As an alternative embodiment for the dump valves 14 and 16, the improved embodiment shown in FIGS. 5 and 6 may be used. The valve arrangement 210 shown in FIG. 5 performs the functions of four sets of the dump valves, i.e. valves 14 and 16, utilized in FIG. 1. Each individual valve, shown in FIG. 6, is equivalent to the two dump valves 14 and 16, as will be explained.

Turning now to FIG. 5, the improved valve is made up of a valve body 212. This valve body 212 is shown having a size sufficient to handle four of the improved valves, but it is to be understood that the valve body may be made of any length and contain any number of the independently functioning valves.

The lines 66 and 68 leading from the remote control valve bank 12 are connected at the top and bottom, respectively, of the valve body 212. Suitable coupling means 214 and 216 are provided. A spool 220 is mounted for reciprocal movement within a valve chamber 218. The spool 220 has circular flanges 222 and 224 on its top and bottom, respectively, as viewed in FIGS. 2 and 3. These flanges 222 and 224 provide a peripheral sealing surface to mate with the sidewalls of the chamber 218. Acting against the outermost flat surfaces of the flanges 222 and 224 are spring members 226 and 228. These spring members are of equal strength and cooperate to center the spool 220, as shown in FIG. 5, when no fluid is being directed through the dump valve. Passageway 231 extends through the valve body 212 to place the portions of the valve chambers 218 lying between the sealing flanges 222 and 224 in communication with each other. A passageway 230 extends from the right-hand chamber 218 to the exterior of the valve body 212 and terminates in coupling member 232 to which is attached the line 234. The opposite end of line 234 (not shown) is connected to the tank 10. As will be readily understood by an examination of FIGS. 5 and 6, the passageways 230 and 231 place the above-mentioned portions of each valve chamber 218 in fluid communication with the line 234 leading to the tank 10.

Turning now to the operation of this embodiment of the dump valve, and assuming for purposes of discussion that this valve has been inserted into the system disclosed in FIG. 1, fluid flowing through the line 66 will enter the top, as viewed in FIGS. 5 and 6, of the valve chamber. The pressure exerted by the oil will overcome the force created by the springs 226 and 228 and force the spool 220 into the position shown in FIG. 6. When in this position, the hose member 102, which is connected to the valve body 212 by coupling member 236, is placed into fluid communication with the line 66. As can be readily seen, the oil moving from the remote valve bank 12 will flow through the valve 210 to the slave cylinder.

As the piston 112 moves, fluid will be returned to the valve chamber through line 104 and coupling means 238. As is also shown in FIG. 6, line 104 is now in communication with the passageway 230 which, in turn, communicates with the tank 10. Oil returning from the slave cylinder 18 will, accordingly, flow to the tank 10. In like manner, should there be oil returning from other slave cylinders to other valve chambers 218 in the valve body 212, this oil would flow through the connecting passageways 231 to the passageway 230 and on to the tank 10.

As shown in FIG. 5, when the spool 220 is in its neutral or central position, lines 102 and 104 are separated from the inlet feeding lines 66 and 68. Both lines 102 and 104 are, however, in communication with the outlet passageway 230 to provide for ease of manual operation, as was explained in connection with the dump valves 14 and 16.

When the handle 31 is returned to its vertical position, and pressurized oil is no longer directed through line 66, the springs 226 and 228 will act to return the spool to its central or neutral position. The springs 226 and 228 may be both tension and compression springs, whereby they will both urge the spool to its neutral position regardless of whether the spool is, as viewed in FIG. 5, in its up or down position. In addition, since a reversal of the operation previously described will result in pressurized oil being directed into the chamber 218 from line 68, there will be an additional positive pressure or force to urge the spool into its proper operating position. Such an arrangement will insure that the spool 220 does not stick.

As can be seen, therefore, the present invention as disclosed herein is well adapted to achieve the objectives set forth at the outset. A relatively inexpensive system which is simple in both manufacture and use, has been devised to provide a reliable and efficient operation. The hydraulic fluid forced from the slave cylinder 18 is quickly removed from the control system.

This eliminates the necessity of overcoming the back pressure which could otherwise be necessary if one tried to force the fluid to return to the remote valve bank. The valve structure utilized in the disclosed embodiment dumps returning fluid from the system, but allows advancing fluid to quickly pass to the cylinder, thereby providing quicker response time, both in operation and in centering the piston 110 after an operation has been completed, and ease of manual operation.

As a result, improved mobility results due to the relatively long, but small diameter, lines that may be used and to the resulting remote valve bank which weighs less than 5 pounds. In addition, an improved dump valve has been devised to provide a more reliable operation as well as a more economical and compact unit.

The present invention, therefore, is well adapted to carry out the objects and attain the ends and advantages mentioned, as well as others inherent therein. While a presently preferred embodiment of the invention has been given for the purpose of disclosure, numerous changes in the details of construction and combination, size, shape and arrangement of parts may be resorted to without departing from the spirit and scope of the invention as herein claimed.

I claim:
1. A valve comprised of:
a chamber having sidewalls;
a spool slidably mounted in said chamber and having at least two annular sealing surfaces for forming sliding seals with the sidewalls;
a first inlet and outlet;
a second inlet and outlet;
spring means for urging the spool into a first position with a predetermined amount of force, one of said surfaces being between said first inlet and outlet when the spool is in its first position;
a second of said surfaces being normally between said second inlet and outlet when the spool is in its first position; and
said first and second inlets being further defined as means for introducing fluid pressure into said chamber in excess of said predetermined force for shifting said spool to second and third positions wherein at least one of said first and second inlets and outlets are in communication in each of said second and third positions.

2. The invention of claim 1 and including, a drain outlet lying intermediate the first and second outlets and in fluid communication with said outlets when the spool is in its first position.

3. The invention of claim 2 wherein said spool is slidable to second and third positions:
said one sealing surface lying between the first outlet and the drain outlet in said second position, said first inlet and outlet being in fluid communication; and
the second sealing surface lying between the second outlet and the drain outlet when said spool is in its third position, said second inlet and outlet being in fluid communication.

4. A valve including a spool chamber comprised of:
sidewalls;
first and second ends;
a first inlet at said first end;
a first outlet adjacent said first end;
a second inlet at said second end;
second outlet adjacent said second end;
a drain outlet intermediate the first and second outlets; an elongate spool having annular sealing surfaces at each end for forming sliding seals with the chamber sidewalls, said spool being slidably mounted in said chamber, and having at least first, second and third positions;
said spool being normally spring biased with a predetermined amount of force into said first position, one of said sealing surfaces being located between the first inlet and outlet, and the second of said surfaces being located between the second inlet and outlet when in said first position, whereby the inlets and outlets are normally not in fluid communication;
said spool being slidable within said chamber to said second position when fluid entering through the first of said inlets exerts a force sufficient to overcome said predetermined amount of force, said one-sealing surface lying between the first outlet and the drain outlet when the spool is in said second position, whereby the first inlet and outlet are in fluid communication; and
said spool being slidable within said chamber to said third position when fluid entering through the second of said inlets exerts a force sufficient to overcome said predetermined force, said second sealing surface lying between the second and drain outlets when the spool is in said third position, whereby the second inlet and outlet are in fluid communication.